Patented July 31, 1923.

1,463,309

UNITED STATES PATENT OFFICE.

ELMER M. DAVIS, OF CHICAGO, ILLINOIS, ASSIGNOR TO SWIFT & COMPANY, OF COOK COUNTY, ILLINOIS, A CORPORATION.

DEODORIZING AND IMPROVING THE QUALITY OF CREAM AND BUTTER FAT.

No Drawing.  Application filed September 6, 1922. Serial No. 586,528.

*To all whom it may concern:*

Be it known that I, ELMER M. DAVIS, a citizen of the United States, residing at Chicago, in the county of Cook, State of Illinois, have invented certain new and useful Improvements in Deodorizing and Improving the Quality of Cream and Butter Fat; and I do hereby declare the following to be a full, clear, and exact description of the invention, such as will enable others skilled in the art to which it appertains to make and use the same.

The present invention has for its object the improvement of the quality of cream and butter fat, and the removal therefrom of foreign, obnoxious and disagreeable odors and flavors, thus converting the cream and butter fat into bland and edible food products.

Cream ordinarily brought to the creamery in certain districts and at certain seasons of the year, has a decidedly off flavor. This may be due to the presence of various obnoxious odors derived from various plants and weeds upon which the cows producing the cream have fed, such as wild onion, leeks, sugar beet tops, sweet fern, and various other aromatic plants and weeds. This flavor or odor, sometimes of a "yeasty" character, may be due sometimes to the producer failing to keep equipment strictly clean. Heretofore butter manufactured from such cream has usually retained some or all of the disagreeable odor and flavor from the cream from which it has been produced, and, on account of its low quality, has been sold at a price below the ordinary price of butter.

According to the present invention, cream having such an off flavor and odor, and normally giving butter of low quality, is subjected to a treatment which removes the objectionable odor and flavor and converts the cream into cream of improved quality, from which high grade butter, substantially free from odor and flavor, can be produced.

According to the process of the present invention, I subject the cream, diluted with a regulated amount of a suitable diluent, and previously neutralized if the acidity of the cream requires it, to a relatively high temperature, such as would cause superheating or scorching of the cream if special precautions to avoid the same were not taken, and I maintain the cream in rapid and violent agitation by means of a finely divided air current for a sufficient period of time to bring about a very considerable concentration of the cream and removal of moisture therefore by evaporation, and for a sufficient period of time to bring about the desired deodorization.

Water, milk, or buttermilk are suitable for use as diluents. Usually better results are obtained with the use of milk, however, water or buttermilk can be used without disadvantage.

The invention will be further illustrated by the following more detailed description illustrative thereof.

The cream ordinarily brought to the creamery at the present time contains from about 24 to about 40 per cent of butter fat by analysis. Most of the cream will analyze approximately 30 per cent, but sometimes, though rarely, the butter fat content will analyze as low as 18 per cent. If the cream is of the usual grade, containing say 24 to 40 per cent of butter fat, I first neutralize the cream, if the acidity is sufficiently high to require this treatment, and then, taking the neutralized or unneutralized product, as the case may be dilute this cream with a regulated amount of water or milk, usually about 25 to 40 per cent by volume, or enough to reduce the butter fat content to approximately 18 to 20 per cent. If it should so happen that the cream already has a low content of butter fat, that is, below about 20 per cent, this preliminary dilution may be unnecessary. The diluted cream, or the cream which already has a low butter fat content, is next introduced into a suitable vessel, preferably glass lined, provided with a source of heat, such as a steam jacket, steam pipe or steam coil, and also provided with means for introducing a rapid current of air through the cream, as by means of a perforated coil or manifold, which will introduce a finely divided and rapid current of air sufficient to maintain the cream in rapid and violent agitation and subdivision. By means of the heating apparatus, the temperature of the cream is rapidly brought to about 170° to 210° F., although in certain cases somewhat lower or higher temperatures may be used, with proportionately longer or shorter time for conducting the process. During the heating, a very rapid stream of subdivided air is blown through the cream, from a suitable source, as from an air blower, or other source of compressed air. It is not sufficient that a moderate current of air be passed through the cream, but the current must be sufficiently rapid to violently agitate and subdivide the cream during its passage, so that the cream is prevented from local overheating by its contact with the heating coil or jacket or other heating means.

The rapid current of air passed through the cream causes a very considerable evaporation of moisture, with resulting cooling effect upon the cream. It is accordingly important that a sufficient source of heat be provided so that the cream will be held at the desired temperature. The heating effect which is thus supplied, to overcome the cooling effect due to the rapid current of air and the resulting evaporation, is, in fact, such as would cause superheating or scorching of the product, except for the rapid agitation which prevents local overheating.

As the process progresses, the cream will be progressively concentrated, due to the evaporation of the moisture and the objectionable odor and flavor will be progressively removed at the same time. This evaporation and concentration and removal of the odor and flavor, will be promoted by the rapid stream of subdivided air that is blown through the cream. The cream will be maintained in a constant and uniform state of agitation and subdivision, and will be brought into instantaneous contact with the heating surfaces, maintained at an elevated temperature, while the effect of such heating surfaces, which would cause superheating or scorching of the cream if it were held in stationary contact therewith, is obviated by the rapid air agitation. If the air is itself preheated, the temperature of the heating means employed need not be so high, or the amount of heating surface need not be so large, but it is entirely feasible to conduct the process with ordinary air which is not preheated, and to use heating surfaces at a sufficiently high temperature to maintain the cream at the desired temperature during the process. The air employed may be preliminarily purified where this is necessary or desirable.

In ordinary cases I have found it sufficient to treat the cream in the manner above described for about one-half hour to one hour, depending upon the amount of odor and flavor to be removed, but this time can be somewhat varied, as in certain cases I have found that a shorter time was sufficient, and in others that a longer time was required. The process is usually continued until the concentration of butter fat is increased to about 30 to 45 per cent, preferably about 35 per cent. The amount of time necessary can be judged by the operator by the amount of odor being removed in the steam and air current from the treating vessel and also by the flavor of the residual cream, samples of which can be withdrawn and tasted from time to time.

Butter fat, as well as cream, may also contain objectionable odors and flavors, as where the butter has been made from cream of off odor and flavor, or where the butter, on standing, has otherwise acquired an off flavor and odor. In treating butter fat, according to the present invention, it is mixed with water or milk and thereby diluted, and then heated to a temperature ranging in ordinary cases from about 170° to about 210° F., with violent agitation by means of an air current. The stream of air which is conducted through the product is sufficient to maintain it in thorough and violent agitation, while the source of heat employed is capable of maintaining the desired temperature and of neutralizing the cooling effect due to the passage of the stream of air and consequent evaporation. Accordingly, although the source of heat is capable of heating the butter fat to a much higher temperature, such as would injure the butter fat if it were held in a stationary condition, such local superheating or overheating is avoided by the violent agitation and the cooling effect incident thereto. With butter fat it is not necessary to add as much diluent as in the case of cream. The amount of diluent added may thus be, for example, between 30 and 40 per cent, and the process may be continued until approximately one-half or more of this moisture has been removed by evaporation, that is, until the amount of moisture remaining is only about 12 to 15 per cent. The amount of time necessary can be ascertained in a similar manner to that above indicated in the case of the treatment of cream.

From the foregoing description, it will be noted that the process of the present invention involves subjecting the cream or butter fat, admixed with regulated amounts of water, milk, or buttermilk, to a combined concentration and deodorization, by subjecting the cream or butter fat and admixed diluent to the heating effect of heating surfaces maintained at a temperature above that of the material being treated, and by subjecting the cream or butter fat and admixed diluent to violent agitation by means of a finely divided air current, which assists in the removal of the odors and flavors and in the concentration, and which serves to avoid local overheating or superheating by maintaining the cream in only instantaneous contact with the heating surfaces, and in the uniformly agitated and admixed condition.

By means of the present invention, cream or butter fat which has an objectionable odor and flavor, and which is accordingly considered of inferior quality, can be freed from its objectionable odor and flavor and converted into products comparable with normal cream and butter fat.

I claim—

1. Method of deodorizing cream and butter fat, which comprises heating the same in admixture with regulated amounts of a diluent, to a temperature of from about 170° to about 210° F., violently agitating the same by directing therethrough rapid current of finely divided air, and continuing the heating and the agitation until a considerable portion of the moisture has been removed by evaporation and desired deodorization has been effected, substantially as described.

2. The method of deodorizing cream and butter fat, which comprises heating the same, in admixture with regulated amounts of a diluent, to a temperature of from about 170° to about 210° F., by means of heating surfaces maintained at a materially higher temperature, violently agitating the same by conducting therethrough a rapid current of cool air sufficient to prevent objectionable over-heating, and continuing the heating and the agitation until a considerable portion of the moisture has been removed by evaporation and the desired deodorization has been effected, substantially as described.

3. The method of deodorizing cream and butter fat, which comprises heating the same, in admixture with regulated amounts of milk, to a temperature of from about 170° to about 210° F., by means of heating surfaces maintained at a materially higher temperature, violently agitating the same by conducting therethrough a rapid current of cool air sufficient to prevent objectionable over-heating, and continuing the heating and the agitation until a considerable portion of the moisture has been removed by evaporation and the desired deodorization has been effected, substantially as described.

4. The method of deodorizing cream, which comprises heating the same, in admixture with sufficient diluent to give a fat content of approximately 18 to 20% to a temperature of from about 170° to about 210° F., violently agitating the same by conducting therethrough a rapid current of air and continuing the heating and the agitation until a considerable portion of the moisture has been evaporated, substantially as described.

5. The method of deodorizing cream, which comprises heating the same, in admixture with sufficient milk to give a fat content of approximately 18 to 20% to a temperature of from about 170° to about 210° F., violently agitating the same by conducting therethrough a rapid current of air and continuing the heating and the agitation until a considerable portion of the moisture has been evaporated, substantially as described.

6. The method of deodorizing cream containing from about 24 to about 40 per cent of butter fat, which comprises diluting such cream to give a fat content of about 18 to 20 per cent, heating the diluted cream to a temperature of from about 170° to about 210° F., by means of heating surfaces maintained at a higher temperature, violently agitating the same by conducting therethrough a rapid current of air sufficient to prevent objectionable overheating, and continuing the heating and agitation until a considerable proportion of the moisture has been removed by evaporation and the cream has been concentrated to a butter fat content of about 30 to 45 per cent.

7. The method of deodorizing cream containing from about 24 to about 40% of butter fat, which comprises neutralizing the cream, diluting such cream with milk to give a fat content of about 17 to 20 per cent, heating the diluted cream to a temperature of from about 170° to about 210° F., by means of heating surfaces maintained at a higher temperature, violently agitating the same by conducting therethrough a rapid current of air sufficient to prevent objectionable overheating, and continuing the heating and agitation until a considerable proportion of the water has been removed by evaporation and the cream has been concentrated to a butter fat content of about 30 to 45 per cent.

In testimony whereof I affix my signature.

ELMER M. DAVIS.